July 30, 1968     C. HALL ET AL     3,394,579
METHODS AND APPARATUS FOR THE PRODUCTION OF EXTRUDED BODIES
Filed Oct. 21, 1965     2 Sheets-Sheet 1
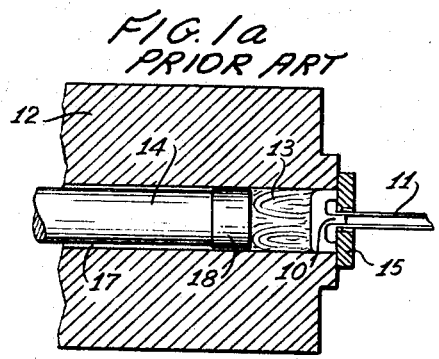
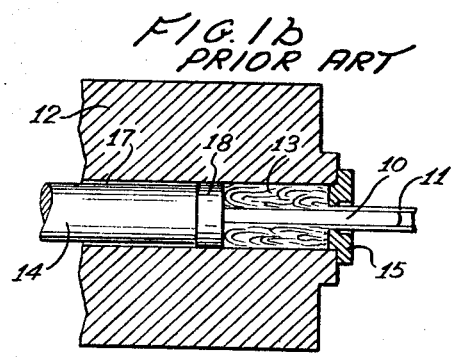
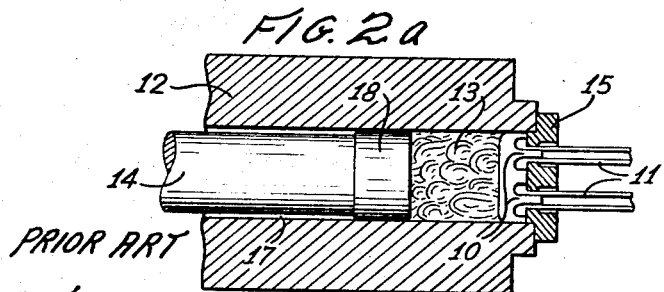
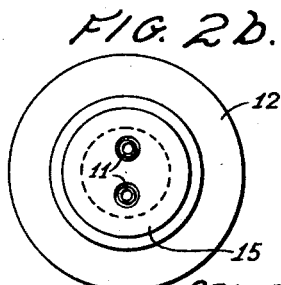
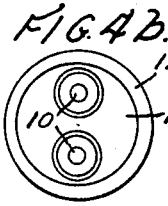
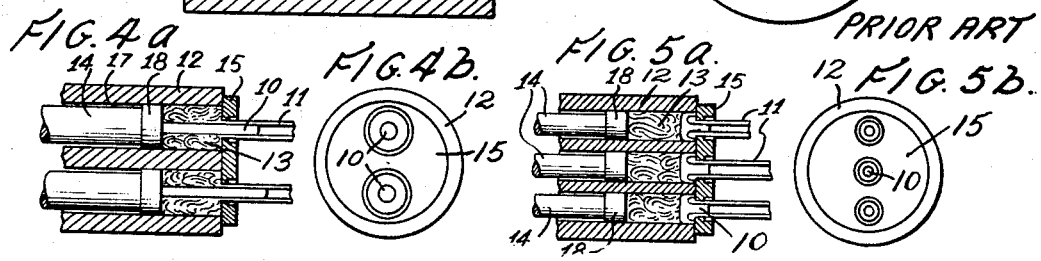
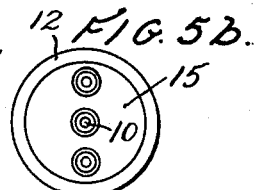
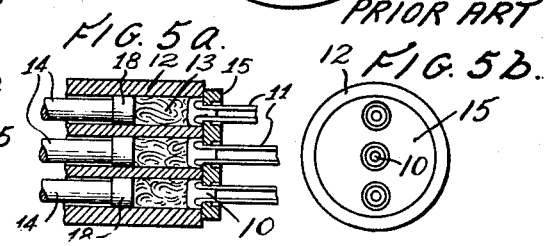
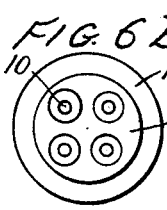
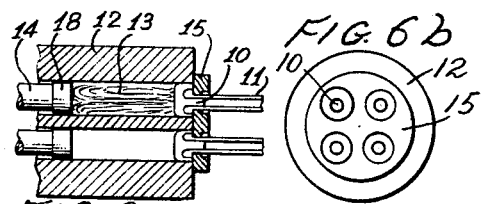
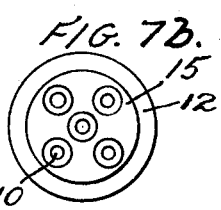
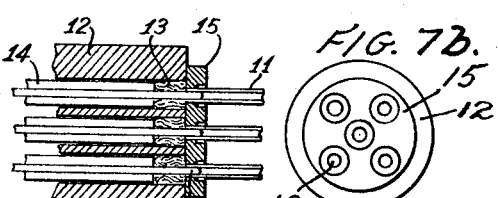
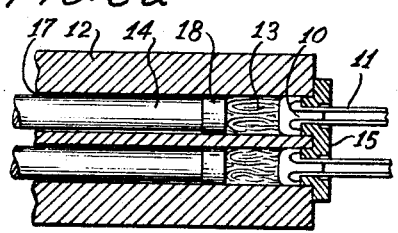
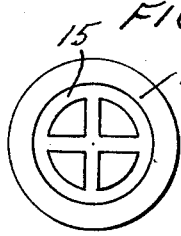

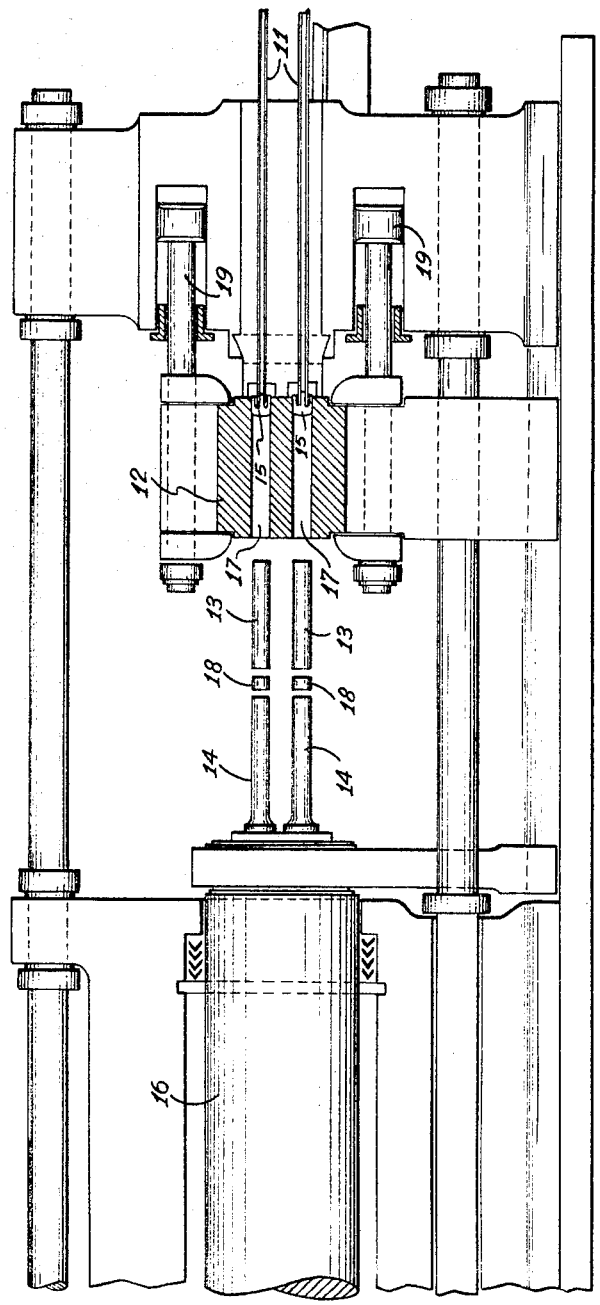

United States Patent Office 3,394,579
Patented July 30, 1968

3,394,579
METHODS AND APPARATUS FOR THE PRODUCTION OF EXTRUDED BODIES
Carlos Hall and Fernando Hall, Calle de Toledo 76, Col. Alamos, Mexico City, Mexico
Filed Oct. 21, 1965, Ser. No. 499,184
11 Claims. (Cl. 72—261)

ABSTRACT OF THE DISCLOSURE

Methods and apparatus for forming a plurality of extrusions simultaneously in which axial force is applied to a plurality of ingots by associated pistons acted on by a common piston to extrude the ingots through respective openings which are centrally disposed with respect to each associated ingot.

---

This invention is directed to the production of extruded bodies and more particularly to extruded tubular bodies in a press of high capacity. More specifically, the invention is concerned with the production of pipe sections of very small diameter, utilizing extrusion presses of high capacity.

A principal problem in the fabrication of tubular sections of small diameter fabricated by a hot extrusion process is that the core, mandrel, or floating plug, which calibrates the inside diameter of the tubular section, must be exactly at the center of the cavity in which the ingot is supported so that when the ingot is acted on by the very high pressure applied by a piston of the press, the material of the ingot flows from perimetral borders thereof to the center of the cavity, to obtain uniformity in the thickness of the walls of the tubular product which is extruded through the die.

As is known, the percentage of reduction for the extrusion of the metals is limited to their intermolecular formation and it is not possible to surpass the limit of reduction in order to extrude a solid ingot into a small, hollow shape. The preceding limitation of reduction restricts the use of high capacity presses to produce only hollow shapes of a size related to the percentage of extrusion of the ingot that is worked. Thus, the hollow shapes which can be produced must be treated subsequently by other industrial cold processes in order to reduce such shapes to the smaller size commercial products desired to be produced.

Heretofore, in order to produce small tubular sections by an extrusion process, relatively small presses have been used. This is greatly inconvenient and production is substantially reduced, whereby the cost of the products increases considerably.

It is an object of the invention to employ a high capacity press to produce tubular extrusions which may be as small as desired.

Heretofore it has been suggested to utilize high capacity presses with dies having a plurality of outlets, so that the reduction of the ingot will be within the permissible degree of reduction. However, due to the fact that at least one of the outlets will of necessity be eccentrically disposed, the flow of metal will not be axial and tubes will be produced which are not straight and which are unequal and non-uniform in wall thickness. The above system has been employed only where precision in the thickness of the walls or straightness of the tubes is not required.

It is another object of the invention to employ a press of high capacity to produce tubes of small size which are straight and of uniform thickness. Thereby, the need for smaller presses to produce tubes of small section is avoided.

Yet another object of the invention is to provide a device enabling the use of a press of high capacity, said device being provided with extrusion cavities in which only axial flow of metal is produced.

It is possible, according to the invention, to produce extrusions of unlimited smallness of size, utilizing presses of any capacity. This produces a considerable saving in fabricating costs, while avoiding the need for diverse equipment to fabricate different sizes of tubular products.

In accordance with the invention, the piston of the press is employed to apply a force against a second piston of reduced size, while an ingot is supported in an extrusion cavity in axial alignment with the second piston, such that the latter extrudes the ingot from the cavity and produces an extrusion of the desired smallness of size.

In further accordance with the invention, a plurality of small pistons may be acted on by the piston of the press and each of the small pistons may in turn extrude an associated ingot through a die in a respective cavity. Thus, a plurality of tubes will be produced for each stroke of the piston of the press.

The cross-sectional area of the cavities will have a sum which does not exceed the size of the maximum single cavity representing the capacity of the press. Thereby, the velocity of travel of the piston of the press and the capacity of the press is not diminished, even when used to produce a plurality of extrusions.

Further objects, features and advantages of the invention will become apparent from a consideration of the invention in the following description taken in conjunction with the attached drawings wherein:

FIGURES 1a and 1b are longitudinal sectional views showing two modifications of apparatus for extruding individual tubes;

FIGURES 2a and 2b respectively show in longitudinal section and in end view apparatus for extruding a plurality of tubes with a single piston, as employed in the prior art;

FIGURE 3 is a side view partly in section of apparatus according to the invention for the production of extrusions using a high capacity press;

FIGURES 4a and 4b respectively show a side section of a portion of the apparatus of FIG. 3 on enlarged scale during an extrusion operation and an end view thereof showing the die employed; and FIGURES 5a, 5b; 6a, 6b; 7a, 7b; and 8a, 8b show modifications of the apparatus of FIGS. 4 and 4b.

In the drawing the same reference numerals will be used for similar elements in the various figures.

As shown in FIGS. 1a and 1b, a high capacity press having a piston 14 is adapted for applying force to a heated ingot 13, in order to produce an extruded tube 11 through a die 15. The piston is accommodated in a cavity or cylinder 17 within a body 12 and force is transmitted to the ingot via a head 18 which is either separate from or integral with the piston 14.

In the embodiment illustrated in FIG. 1a there is shown a core which calibrates the inside diameter of the tubular section 11 which is produced. The die 15 determines the outside diameter of the produced section. In FIG. 1b there is shown a mandrel or plug which serves the same function as the core heretofore described. Due to the application of the high pressure by the piston 14 against the hot ingot 13, the metal of the ingot flows from the outer portions towards the center of the cavity 17. In order to obtain uniformity of thickness of the walls of the tubular section 11, it is necessary that the opening of the die 15 and the core or mandrel 10 be substantially at the center of the cavity 17.

For a given size diameter of cavity 17, there is a minimum diameter die and corresponding minimum thickness of the tubular section which can be produced. If tubular sections of smaller size are desired, then it is necessary to resort to some additional means in order to obtain such sections.

In FIGS. 2a and 2b there is shown a commonly used expedient in the prior art by which tubes can be formed of a size smaller than that which can be produced in the press of FIGS. 1a and 1b. In this device, a pair of openings are provided in die 15 which are eccentrically disposed relative to the central axis of cavity 17. While the device of FIGS. 2a and 2b will produce tubes 11 of the generally required size, it has been found that these tubes are not uniform in thickness. This is attributable to the fact that the flow of the metal 13 initially moves along a path from the surface of the ingot to the center of the cavity 17 and then through the outlets of the die 15, which produces a turbulence of the metal and the generation of lateral forces on the core or plug. As a result thereof, the metal is discharged through the die in unequal amounts, resulting in variation in the thickness of the walls of the tubes 11.

The device according to the invention as shown in FIG. 3, avoids the above and produces only axial flow of metal in the extrusion cavities, as will be apparent from the following description.

In FIG. 3 there is shown a container or body 12 having a plurality of cavities 17 therein. Associated with each of these cavities is a respective piston which is axially aligned with its corresponding cavity. The cavities 17 and pistons 14 all extend parallel to one another. The pistons 14 are secured to the piston 16 of the press and lie in axial extension thereof. An individual ingot 13 is adapted for being inserted into each cavity 17 and for being acted on by the force of piston 16 through the intermediary of the pistons 14 so as to be extruded from the cavities 17. Heads 18 may be inserted between the pistons 14 and the ingots 13 or they may be integral with piston 14. There are provided individual bridge dies 15 in each of the cavities 17, wherein the openings are centrally disposed with respect to the associated cavity 17. The sum of the cross-sectional areas of the cavities 17 does not exceed the size of the maximum single cavity representing the capacity of the press. Generally the latter is the diameter of the cylinder in which the piston 16 of the press is displaceable. Because of the above relationship, the velocity of travel of the piston and the capacity of the press is not diminished when used to produce a plurality of extrusions. In this respect it is possible to place ingots in each of the cavities 17 and thereby produce a plurality of tubes 11. Alternatively, any number less than the full number of cavities 17 can be filled with an ingot.

It will be appreciated with above construction that when hydraulic pressure is applied to the piston 16 and a plurality of tubes are produced, the metal in each cavity 17 will be extruded through its own associated die individually and in perfectly centered and uniform form.

FIGS. 4a and 4b show a container 12 in which a single die 15 is employed, having respective openings which are centrally disposed with respect to an associated cavity 17. In each cavity are employed respective cores 10 which are also centrally disposed in the cavities.

FIGS. 5a and 5b show an arrangement wherein three outlets are provided in the die 15 and separate cores are employed in each cavity.

FIGS. 6a and 6b are similar to FIG. 3, with the exception that therein is shown four outlets in the die 15.

FIGS. 7a and 7b are similar to FIGS. 4a and 4b, but show five outlets in the die 15. FIGS. 7a and 7b represent a more advanced stage of compression of the material 13, as compared, for example, with FIGS. 4a, 4b; 5a, 5b; and 6a, 6b.

FIGS. 8a and 8b show the use of a horizontal and a vertical cross-piece to subdivide a single cavity in the container 12 into four segmented cavities having the cross-sectional configuration of sectors of a circle. While four segments have been shown by the crosspiece arrangement in FIGS. 8 and 8b, it will be understood that a greater or lesser number can be employed as desired. The heads 18 of the pistons 14 will correspond in shape to the cross-section of the respective cavities, while the outlet of the die will be disposed at the center of the segment of sector shape. The plugs 10 will be disposed coaxially with the die outlets so that tubes of uniform wall thickness will be produced. The die may also have a shape other than circular so that a non-circular tube can be extruded.

In all of the above embodiments in FIGS. 3–8a, 8b, the flow of metal will be along streams which extend in straight lines to the outlet of the die. The turbulent flow heretofore present as exemplified by the device of FIGS. 2a and 2b is avoided. Thus, tubes of uniform thickness will be produced, irrespective of the smallness of their size, while employing a high capacity press.

The operation of the embodiment shown in FIG. 3 is as follows:

The solid cylindrical ingots 13 of a diameter and length required for the type of extrusion press used, are heated to an elevated temperature corresponding to the type of metal or alloy used, so as to enable subsequent extrusion thereof. The heated ingot is transferred from a furnace, manually or by a conventional mechanical mechanism, and introduced into the cavities 17 of the container 12. Immediately thereafter, the heads 18, if separate from the pistons 14, are placed in the cavities 17. Hydraulic pressure is then applied to piston 16, which causes the pistons 14 to enter the cavities 17 and force the metal in each cavity through the extrustion dies 15 to form individual tubes 11. The pressure will be maintained until the extrusion of the entire ingot 13 in each cavity 17 is obtained. Upon completion of the extrusion operation, the press is opened by applying pressure to the auxiliary pistons 19, after which the dies 15 and the extruded tubes 11 are withdrawn from the container 12.

New dies 15 are then inserted into the cavities 17 of the container 12 and the press is then closed by withdrawing the pistons 19. Thereafter a new extrusion cycle may be commenced.

Numerous modifications and variations of the above-described embodiments and methods of operation will be apparent to those skilled in the art without departing from the scope and spirit of the invention as defined in the attached claims.

What is claimed is:

1. A method of forming a plurality of extrusions simultaneously comprising simultaneously applying axial force to a plurality of ingots to extrude the ingots through respective openings which are centrally disposed with respect to each associated ingot.

2. A method of employing an extrusion press of high capacity to produce a plurality of extrusions, said method comprising positioning a plurality of extrusion cavities in front of the piston of the press, placing a separate ingot in each cavity for being extruded, and applying force to said ingots in the cavities simultaneously by the piston of the press to cause said ingots to be extruded centrally through an associated die at the end of each cavity.

3. In an extrusion press having a piston and a cylinder in which said piston travels, an improvement enabling use of said press to produce extrusions which are too small to be produced directly from ingots in said cylinder, said improvement comprising a body having a plurality of cavities adapted for containing an ingot, said cavity having a substantially reduced diameter compared to that of the cylinder, a second piston aligned in each of said cavities for penetrating therein, the second pistons being associated with the first piston for being driven thereby into said cavities; and die means in said cavities for producing extruded bodies from said ingots under the action of the force of said second pistons.

4. Apparatus for producing extrusions comprising a press including a driven piston, means defining a plurality of parallel cavities each having opposite open ends, said means being positioned adjacent the piston with a first of the ends of the cavities facing the piston, die means co-axially located at the other of the ends of the cavities for producing tubular extrusions and a second piston in axial alignment with each cavity for receiving force applied by said piston to urge metal in any cavity through the die associated therewith.

5. Apparatus as claimed in claim 4, wherein said piston of the press, the individual pistons and the cavities are all in parallel relation.

6. Apparatus as claimed in claim 4, wherein said individual pistons are secured to the piston of the press.

7. Apparatus as claimed in claim 4, wherein said die means is a bridge die for producing tubular extrusions.

8. Apparatus as claimed in claim 4, wherein said die means is a mandrel for producing tubular extrusions.

9. Apparatus as claimed in claim 4, wherein said individual pistons are secured to the piston of the press in eccentric disposition with respect to the axis thereof.

10. Apparatus for producing extrusions comprising a press including a driven piston, means defining a plurality of parallel cavities each having opposite open ends, said means being positioned adjacent the piston with a first of the ends of the cavities facing the piston, die means at the other of the ends of the cavities and hydraulically actuated pistons coupled to the means defining the cavities for displacing the latter relative to said piston.

11. An extrusion container adapted for use with a high capacity press having a driven piston, said container comprising a body having a plurality of cavities each with opposite open ends, an individual piston for each of said cavities, means for inserting the individual pistons simultaneously into their respective cavities in response to operation of the piston of the press, and die means at a first of the ends of the cavities for extruding metal ingots in the cavities which are subjected to pressure by the individual pistons.

References Cited
UNITED STATES PATENTS

| | | | |
|---|---|---|---|
| 1,741,813 | 12/1929 | Boynton | 72—261 |
| 1,856,483 | 5/1932 | Judge | 72—264 X |
| 2,723,028 | 11/1955 | Carter | 72—261 |
| 3,224,240 | 12/1965 | Muller | 72—259 |

CHARLES W. LANHAM, *Primary Examiner.*

K. C. DECKER, *Assistant Examiner.*